United States Patent
Holm (10) Patent No.: US 10,079,680 B2
(45) Date of Patent: Sep. 18, 2018

(54) SELECTIVE REVOCATION OF CERTIFICATES

(71) Applicant: EMERGING SENSE, AFFÄRSUTVECKLING AB, Sollentuna (SE)

(72) Inventor: Peter Holm, Sollentuna (SE)

(73) Assignee: EMERGING SENSE, AFFARSUTVECKLING AB, Sollentuna (SE)

(*) Notice: Subject to any disclaimer, the term of this patent is extended or adjusted under 35 U.S.C. 154(b) by 220 days.

(21) Appl. No.: 14/906,176

(22) PCT Filed: Jul. 8, 2014

(86) PCT No.: PCT/SE2014/050876
§ 371 (c)(1),
(2) Date: Jan. 19, 2016

(87) PCT Pub. No.: WO2015/009231
PCT Pub. Date: Jan. 22, 2015

(65) Prior Publication Data
US 2016/0164677 A1   Jun. 9, 2016

(30) Foreign Application Priority Data
Jul. 17, 2013   (SE) .................................. 1350893

(51) Int. Cl.
*H04L 9/30* (2006.01)
*H04L 9/32* (2006.01)
*H04L 29/06* (2006.01)

(52) U.S. Cl.
CPC .............. *H04L 9/30* (2013.01); *H04L 9/3247* (2013.01); *H04L 9/3268* (2013.01);
(Continued)

(58) Field of Classification Search
CPC ....................................................... H04L 9/30
See application file for complete search history.

(56) References Cited

U.S. PATENT DOCUMENTS 8,635,442 B2 * 1/2014 Agrawal ............... H04L 9/3268
713/155
9,082,279 B2 * 7/2015 Le Cam ........... G08B 13/19656
(Continued)

FOREIGN PATENT DOCUMENTS

| EP | 1 643 402 A2 | 4/2006 |
|---|---|---|
| WO | 2005052217 A1 | 6/2005 |
| WO | WO 2006/112759 A1 | 10/2006 |

OTHER PUBLICATIONS

International Search Report (PCT/ISA/210) dated Oct. 16, 2014, by the European Patent Office as the International Searching Authority for International Application No. PCT/SE2014/050876.
(Continued)

*Primary Examiner* — Kambiz Zand
*Assistant Examiner* — Thanh Le
(74) *Attorney, Agent, or Firm* — Buchanan Ingersoll & Rooney P.C.

(57) ABSTRACT

A method for validating a set of payload data by means of said servers. The method includes validating information related to a set of payload data, based on which a check code has been calculated and encrypted by means of an asymmetric cryptographic key pair (A). The encrypted check code (1.11) has been stored at the archive server and associated with a time stamp, which can be used for validation of the set of payload data. The method may enable a selective revocation of certificates that have been used for signing the set of payload data.

14 Claims, 3 Drawing Sheets

(52) U.S. Cl.
CPC .......... *H04L 9/3297* (2013.01); *H04L 63/061* (2013.01); *H04L 63/123* (2013.01); *H04L 63/126* (2013.01)

(56) References Cited

U.S. PATENT DOCUMENTS

| | | | |
|---|---|---|---|
| 2001/0051614 | A1 | 12/2001 | Levin et al. |
| 2006/0075245 | A1* | 4/2006 | Meier ..................... G06F 21/64 713/176 |
| 2012/0218043 | A1 | 8/2012 | Le Cam et al. |
| 2013/0132718 | A1 | 5/2013 | Agrawal |
| 2014/0250298 | A1 | 9/2014 | Thoursie et al. |

OTHER PUBLICATIONS

Written Opinion (PCT/ISA/237) dated Oct. 18, 2014, by the European Patent Office as the International Searching Authority for International Application No. PCT/SE2014/050878.

Office Action (Notification of Reasons for Refusal) dated May 22, 2018, by the Japanese Patent Office in Corresponding Japanese Patent Application No. 2016-527975 and an English Translation of the Office Action, (7 pages).

Yamaji K. et al.,"Development of the long term signature application and validation environment to preprint documents" Journal of Japan Society of Information and Knowledge, Japan, Japan Society of Information and Knowledge, Oct. 20, 2008, vol. 18, 3rd issue, pp. 240-248.

Report on Educational Project of Digital Signature and Validation Service, Promotion Project of Utilization of Digital Signature and Validation Service (Educational Project of Digital Signature and Validation Service) 2009, Japan, JIPDEC [online], Jan. 14, 2010, pp. 22-40, [Retrieved on Jan. 26, 2012], Internet, URL.

Carmela T. et al., Improving Secure Long-Term Archival of Digitally Signed Documents, Proceedings of the 4th ACM International workshop on Storage security and survivability (StorageSS '08), U.S., ACM, Oct. 31, 2008, pp. 27-36.

\* cited by examiner

SELECTIVE REVOCATION OF CERTIFICATES

FIELD OF THE INVENTION

The invention disclosed herein relates to authentication, non-repudiation and integrity of information. More precisely, it relates to a signing server, an archive server, and a validation server used for signing, storing, and validating a set of payload data by means of asymmetric cryptographic key pairs. The invention also relates to methods performed in said servers.

BACKGROUND OF THE INVENTION

Today, organizations and individuals deliver great amounts of information to customers and other communication parties via the Internet. The information may comprise marketing information or subscribed information in the form of e.g. newsletters. To an ever-increasing extent, companies also choose to deliver evidence of legal rights, such as invoices, account statements, insurance statements, salary statements, etc. For this type of information, there is a strong requirement that it should be possible to verify at the recipient side that the information was produced by a known entity, that the entity cannot deny having produced the information, and that the information has not been altered. This is often referred to as authentication, non-repudiation, and integrity of information.

One attempt to meet these requirements is represented by digital signatures employing asymmetric cryptography. According to this mechanism, a hash code and an asymmetric key pair is used for ensuring authenticity, integrity and non-repudiation of the information. The check code, which e.g. corresponds to the hashed information, is encrypted using the private key of the asymmetric key pair, and then delivered with the information and a copy of the public key of the asymmetric key pair. The calculating and encrypting of the check code may be referred to as "signing", or "sealing", the information, whereas the encrypted check codes may be referred to as a "signature". The information may subsequently be verified together with its encrypted check code and the copy of the public key of the asymmetric key pair in analogy with the cryptographic algorithm used for calculating and encrypting the said check code.

An example of an available solution is described in WO 2006/112759 A1, wherein a key history is used for administering the key pairs and to keep track of if and when the keys ceased to be used so as to facilitate monitoring and administering of the validity of the keys over time. However, there is still a need for a mechanism providing enhanced authentication, non-repudiation, and integrity of information.

SUMMARY OF THE INVENTION

It is an object of the present invention to alleviate the problem of ensuring authenticity, integrity, and non-repudiation over time. It is a particular object of the present invention to improve the control of the validity of the cryptographic key pair used when signing a set of payload data.

Accordingly, the invention provides a signing server, an archive server, and a validation server, as well as a method in said respective servers, having the features set forth in the independent claims. Advantageous embodiments of the invention are defined by the dependent claims.

Hence, according to a first aspect of the present invention, a method related to a signing server is provided, wherein an encrypted first check code, which check code e.g. corresponds to hashed information, is outputted. The method comprises calculating a first check code based on a set of payload data and encrypting the check code by means of a private key of a first asymmetric key pair associated with a first trusted identity, wherein the encrypted first check code then is transmitted to an archive server over a communication network. Alternatively, or additionally, the first check code or the encrypted first check code is associated with an identifier which is transmitted to the archive server over the communication network. The method also causes calculation of a second check code which is based on the set of payload data, or information derived from the set of payload data, and a time stamp. Preferably, two distinct values of the time stamp will lead to distinct second check codes even if combined with identical sets of payload data. Further, the method causes encryption of the second check code using a private key of a second asymmetric key pair, which is associated with a second trusted identity, and storage of the encrypted first check code and/or said identifier.

According to a second aspect, a signing server is provided, having at its disposal a first calculating unit adapted to calculate a first check code based on a set of payload data, and a first encrypting unit adapted to encrypt the first check code using a private key of a first asymmetric key pair associated with a first trusted identity. The signing server also has at its disposal a time-stamp generating unit adapted to provide a time stamp, which together with the first check code, or information derived from the set of payload data, is inputted to a second calculating unit adapted to calculate a second check code. Further, the signing server has at its disposal a second encrypting unit which is adapted to encrypt the second check code using a private key of a second asymmetric key pair associated with a second trusted identity, and a first communication interface adapted to transmit the encrypted first check code to an archive server over a communication network and to cause storage of the encrypted first check code. Alternatively, or additionally, the signing server establishes an association between an identifier and the encrypted first check code, which is transmitted to the archive server at which it is stored. The signing server may e.g. create a data record or entry indicating the association. Further, a second communication interface is adapted to output the encrypted first check code.

It will be appreciated that the time stamp may be generated at the signing server or an archive server, or supplied by an entity associated with the first trusted identity or the second trusted identity. The time stamp may also be supplied by a third party, which should, in the context of the present application, be understood as an entity which is not associated with, or dependent on, any one of the first and second trusted identity. The second check code may be calculated and/or encrypted at the signing server, the archive server, or at a third party application which is not associated with any one of the first and second trusted identity.

It is assumed that the associations between the asymmetric first and second key pairs and the respective first and second trusted identity may be securely handled and publicly verifiable. The associations may be obtained by means of a certificate comprising the first and second asymmetric key pairs and the respective first and second trusted identity, which certificate is issued by a certificate authority. The certificate authority guarantees the validity of the relation between the first and second asymmetric key pairs and the respective first and second trusted identity.

The present invention is advantageous in that it provides an improved mechanism for ensuring secure distribution, storage, and transmission of a set of payload data. By using a first check code for sealing the set of payload data and a second check code for sealing the set of payload data with a time stamp, the level of security may be improved. Encrypting the first and second check code using a public key of a first and second asymmetric key pair, respectively, allows for an entity, such as a company or an organization, to tie the first and/or the second check codes to its unique identity or brand. An entity could also refer so a person or a computer operated or controlled by such person, company or organization.

The present invention is also advantageous in that by storing the encrypted first check code at e.g. an archive server, the validity of any encrypted check code may be assessed by comparing the encrypted check code with the stored encrypted check codes. Alternatively, or additionally, other identifying information derived from or associated with the set of payload data, e.g. a serial number of the signature, the unencrypted first check code, or even the payload data itself, may be stored so as to enable future assessment of the authenticity and integrity of any set of payload data. According to an embodiment of the present invention, an end time associated with the public key of the first asymmetric key pair may be provided. The end time may e.g. be determined as the first asymmetric key pair is created, or may be set by a user, such as e.g. the first trusted identity, or a signatory. The first trusted identity may e.g. associate an end time with the public key of the first asymmetric key pair in case the key pair has been stolen, copied, or otherwise used without permission from the first trusted identity. Thereby unauthorized future use of the first asymmetric key pair advantageously may be prevented.

Further, the public key of the first asymmetric key pair may be associated with information indicating that said key has been revoked. A revoked key should be understood as a key that may not be trusted per se, which implies that signatures created with the private key of a first asymmetric key pair may only be considered valid if the signatures, i.e. encrypted first check codes and/or identifiers associated with said first check codes, are stored as valid signatures in the archive server. A key can be revoked for various reasons, e.g. when there is a suspicion that the signing mechanism has been used unauthorized, or if the encryption is no longer considered secure due to technical progress in the field, e.g. that the key length used is considered to be too small. Thereby an unauthorized user may be prevented from using the key pair to sign an antedated set of payload data. The information indicating that the key is revoked may e.g. be realized as an information element, or indicator, being associated with the said key pair. The information that the key pair is a revoked key pair and or/the end time may advantageously be transmitted from the signing server to the archive server, wherein it may be stored together with the encrypted first check code (or identifier associated with the first check code).

If an asymmetric key pair has been revoked, e.g. due to non-authorized use or theft, authenticity and integrity of a set of payload data may still be declared if the encrypted first check code matched a stored encrypted check code that is declared valid, which in turn may be based on the logging of the encrypted first check code indicating that the asymmetric key pair was used at, and the encrypted first check code hence uploaded from, a signing server for which there exists an association between said signing server and said key pair, which association is declared as valid. Thereby a selective revocation of an asymmetric key pair may be enabled, only declaring signatures that are indicated as being encrypted with a stolen or unauthorized used copy of said key pair as non-valid, while other signatures, which are encrypted in the original signing server, are declared as valid.

According to an embodiment, the method according to the first aspect is performed in response to a request by a first entity associated with the first trusted identity. The first entity may e.g. be a network unit, an executed process or a user, and the first trusted identity the related IP or MAC address or physical location of the first entity. The encrypted first check code, the identifier, and/or the encrypted second check code may be stored in a storage area, which advantageously may be protected so as to ensure that the encrypted first and second check codes cannot be deleted upon request by the first entity. Thereby a fraud scenario, e.g. repudiation, can be prevented.

According to an embodiment, the signing server may be during the transmitting be identified by means of its network node, such as its IP address. Alternatively, or additionally, the signing server may be identified by means of a e.g. a list or log comprising first check codes, encrypted first check codes and/or identifiers associated with said first check codes and which have been produced by, or upon request by, the signing server or upon request by the first entity. The identifiers may e.g. comprise serial numbers of the produced encrypted first check codes. Further, a first entity, which may be associated with the first asymmetric key pair, may cause the production, or calculation, of the encrypted first check codes in (or request by) the signing server. During the transmitting of the encrypted first check code and/or the identifier to the archive server, the first entity may be identified in a similar way as the signing server, i.e. by means of the network address, or IP address, of the signing server and/or a stored list of encrypted first check codes calculated upon request by the first entity. The log may e.g. comprise the first check codes, the encrypted first check codes or a set of identifiers for the first check codes, e.g. serial numbers for the signatures. The first entity may also be identified by means of an authentication means, such as a smart card reader, a file based key pair, a smart phone APP or a password, together with the network address at which the authentication means is used, such as e.g. an IP address, a MAC-address of the location at which it is used.

The present embodiment advantageously allows for the signing server to be identified together with information identifying the first key pair. The archive server may thereby associate the first key pair and the signing server, e.g. by storing an association between the information identifying the first key pair and the information identifying the signing server. Hence, the key pair used at the server may be logged over time so as to further improve the mechanism for ensuring secure distribution and to verify the authenticity and integrity of a set of payload data. For example, an encrypted first check code or identifier that is uploaded or transmitted to the archive server from a signing server which is not associated with the signing server may indicate that the private key of the first asymmetric key pair has been stolen and used without authorization at a new signing server. The first asymmetric key pair may then be associated with the new signing server and the combination of the first asymmetric key pair and the signing server declared as non-valid by e.g. the archive server. Similarly, the transmitted encrypted first check code or identifier may be declared as non-valid by e.g. the archive server in case being transmitted from a signing server which is not associated with the first asymmetric key pair. Logging the identity of the signing server hence allows for a distinction between a check code which has been encrypted by an entity associated with the first trusted identity, and a check code for which there is an indication that it has been encrypted using a stolen copy of said private key used from another signing server. Similarly, the encrypted first check code (or the associated identifier) that is uploaded or transmitted to the archive server may be associated with an identity of the first entity which causes the production of encrypted first check codes. The first entity may e.g., as previously described, be identified by means of an authentication means. In case a change of information identifying the first entity is detected upon transmission of an encrypted first check code or identifier, it may therefore be assumed that the authentication means has been stolen. The detection may e.g. be realized by comparing received information identifying the first entity with previously stored information. Upon detection of an assumed theft of authentication means, the archive server may output an alarm. The first entity may further be considered as invalid, and hence all encrypted first check codes that have been produced upon request by the said first entity may be declared as invalid.

According to an embodiment, the second check code is calculated and encrypted at the archive server from which it is transmitted together with the time stamp to the signing server. The signing server may then output the encrypted second check code and the time stamp together with the encrypted first check code.

According to an embodiment, encrypted second check code and the time stamp is outputted after the encrypted first check code or the identifier has been transmitted to the archive server. The time stamp and the encrypted second check code can e.g. be seen as a signature which may be outputted with the set of payload data so as to enable verification of the integrity and non-repudiation of the set of payload data. By ensuring that the encrypted first check code or the identifier is transmitted to the archive server prior to outputting the signature, the signing server can be identified, which information can be used to detect unauthorized use of said first key pair in new signing servers. The reliability of the signature may thus be enhanced and the risk for a fraud scenario reduced.

Alternatively, or additionally, the signing server may receive information derived from the set of payload data in response to the storage of the encrypted first check code at the archive server. The received information, such as e.g. a serial number, a time stamp or a check code, can be used as a receipt verifying storage of the encrypted first check code at the storage area of the archive server.

According to an embodiment, the first asymmetric key pair is associated with the signing server, such as the identity of the server, its IP address, or a physical address which the first asymmetric key pair occupies in a computer storage medium of the signing server. It will also be appreciated that the association between the first asymmetric key pair and the archive server may be realized by an association between the first asymmetric key pair and a third asymmetric key pair which may be used by the archive server for encrypting the time stamp or other information confirming receipt of the encrypted first check code or the identifier. This advantageously allows for the signing server to be provided with information of where to transmit the encrypted first check code, and also allows for a validation server to verify that said check code has been sent to the correct archive server. Accordingly, the association also allows for the origin of the receipt, verifying storage of the encrypted first check code or the identifier at the storage area, to be verified. In one example, an administrative cryptographic key pair is used to communicate with a certificate authority to request said first asymmetric key pair. The administrative key pair can also be used when the first asymmetric key pair should cease to be used, and when it should be revoked, so as to ensure continuity of identification over time if the first asymmetric key pair needs to be exchanged. The administrative key pair could e.g. be used for authentication in relation to a certificate authority administering the certificate and/or signing a statement, such as a statement for requiring said first administrative key pair, a statement that an already issued key pair is started being used at a certain time, a statement that the administrative key pair is ceased being used at a certain time, and a statement that the first administrative key pair is revoked, respectively.

According to a third aspect of the present invention, a method in an archive server is provided, in which method an encrypted first check code, and/or an identifier associated with the first check code, is received from a signing server. The encrypted first check code is based on a set of payload data and has been encrypted using a private key of a first asymmetric key pair associated with a first trusted identity. The method further comprises storing the encrypted first check code and/or said identifier, in a storage area of the archive server, which is adapted to provide the encrypted first check code or identifier upon request by a validation server.

According to a fourth aspect of the present invention, an archive server is provided, having at its disposal a first communication interface adapted to receive, from a signing server, an encrypted first check code which is based on a set of payload data, wherein the first check code is encrypted using a private key of a first asymmetric key pair associated with a first trusted identity. Further, the archive server disposes a storing unit adapted to store the encrypted first check code and/or the identifier in the archive server, and a second communication interface adapted to provide the encrypted first check code or identifier upon request by a validation server.

It will be realized that the first and second communication interface may be realized as one communication interface or communication unit. Further, the archive server may receive other information than the encrypted first check code, such as e.g. the set of payload data, the first check code, or other information derived from the set of payload data.

As previously mentioned, storing the encrypted first check code and/or the identifier at an archive server advantageously allows for the validity of the signature to be assessed by comparing its encrypted first check code with the stored encrypted check code or the identifier. Further, the storage area may be protected such that e.g. the first entity is prevented from removing or modifying information stored in the storage area.

According to an embodiment, the first communication interface may be adapted to obtain, upon receiving and/or storing the encrypted first check code or the identifier, information identifying the signing server. Additionally, or alternatively, information may be obtained which identifies the first entity, e.g. by means of an authentication means. The identification of the signing server and/or the first identity has been described in more detail in connection with the first and second aspects, and will for the sake of economy not be described once again.

The identity of the signing server may be associated with the first asymmetric key pair, which advantageously allows for the identity of the signing server to be monitored over time. This also enables non-valid signing servers to be identified. When logging a series of encrypted first check codes, an unexpected change of identity of the signing server may e.g. indicate that a private key of the first key pair has been stolen and is now used with the new signing server. The non-valid signing server may e.g. be detected by the archive server. As previously described, the first entity may be identified so as to detect non-valid first entities and/or assumed theft of authentication means.

Further, the archive server may declare the encrypted check code or identifier valid if it is associated with information identifying a valid signing server or associated with information indicating that the encrypted first check codes have been produced upon request by a valid first entity. Such declaration may be transmitted to a validation server.

By identifying unauthorized changes in the identity of the signing server and/or the identity of the first entity the associated encrypted first and/or second check codes may be declared as non-valid by e.g. the archive server or the validation server. A change of signing server may also result in other actions by said servers, such as e.g. reducing the access of the signing server to the archive server for a predetermined period of time and/or by reducing the access of a first entity to cause the production of new first check codes.

According to an embodiment, the storing unit is adapted to store, in the storage area, an end time associated with the public key of the first asymmetric key pair, and information indicating that said public key is revoked. This corresponds to the steps of causing storage of the end time and information indicating that the public key is revoked which were described in connection with the method of the first aspect of the invention. The storing of the end time and said information may e.g. be performed upon request by the signing server. The revocation of the public key may e.g. be initiated by a detected change of signing server, or upon request at a later stage. Further, the key pair may be selectively revoked, i.e. only encrypted check codes which are transmitted from a selected network node of plurality of network nodes may be regarded as valid check codes. The selective revocation advantageously allows for encrypted check codes which have been transmitted to the archive server to be declared as non-valid if they are transmitted from a signing server node that was not authorized, or non-valid, at the time of the transmittal. The revocation may be performed in connection to the time of the transmittal, or at a later point of time. Advantageously, the selective revocation allows for encrypted check codes transmitted from a valid network node, or check codes being classified as valid, to remain valid and hence unaffected by the selective revocation.

According to an embodiment, a second check code is calculated at the archive server based on the information derived from the set of payload data, such as e.g. the first check code, and a time stamp. The second check code may then be encrypted at the archive server, e.g. using a private key of a second asymmetric key pair associated with a second trusted identity controlling the archive server. The encrypted second check code and the time stamp may then be transmitted to the signing server, e.g. in response to the storing of the encrypted first check code or the identifier. Providing the time stamp and encrypting the second check code at the archive server enables for enhanced non-repudiation of the set of payload data, especially in case the archive server is controlled by a trusted third party, such as e.g. a certificate authority (CA).

According to a fifth aspect of the present invention, a method in a validation server is provided. According to this aspect, the authenticity of a received encrypted first check code, which is based on a set of payload data, is verified using a public key of a first asymmetric key pair being associated with a first trusted identity. Further, the authenticity of a received encrypted second check code, being based on the first check code and a time stamp, is verified using a public key of a second asymmetric key pair associated with a second trusted identity. The method also comprises verifying, if there is an end time associated with the public key of the first asymmetric key pair, that the time stamp precedes the end time, and that the public key of the first asymmetric key pair is not revoked. In case of positive results of said verifications, authenticity and integrity of the set of payload data is declared. Further, at least one encrypted first check code or an identifier associated with the first check code may be requested from an archive server storing the encrypted first check code and/or the identifier. It is then verified that the received encrypted first check code corresponds to the stored encrypted first check code (or the identifier), which e.g. may be stored in a table. In response to positive results of said verifications, authenticity and integrity of the set of payload data is declared.

According to a sixth aspect, a validation server is provided, having at its disposal a processing unit which is adapted to verify, using a public key of a first asymmetric key pair associated with a first trusted identity, the authenticity of a received encrypted first check code which is based on a set of payload data, and to verify, using a public key of a second asymmetric key pair associated with a second trusted identity, the authenticity of a received encrypted second check code which is based on the first check code and a time stamp. The processing unit is also adapted to verify, if there is an end time associated with the public key of the first asymmetric key pair, that the time stamp precedes the end time, and that the public key of the first asymmetric key pair is not revoked. If the results of the verifications are positive, authenticity and integrity of the set of payload data is declared. In case of the public key of the first asymmetric key pair being revoked, the processing unit requests at least one encrypted first check code or an identifier from an archive server storing the encrypted first check code and/or the identifier, and verifies that the received encrypted first check code or identifier corresponds to the stored encrypted first check code. In response to a positive result, authenticity and integrity of the set of payload data is declared.

Either of the signing server, the archive server, and the validation server may be structurally integrated with one or both of the other servers. The servers may also be structurally distinct, i.e. physically separated and/or located on different geographical positions, even if connected or being connectable to each other via e.g. a communication network.

It will also be appreciated that a plurality of encrypted first check codes or identifiers may be requested from the archive server. It is also verified that the received encrypted first check code corresponds to at least one of said requested plurality of encrypted first check codes or identifiers.

According to an embodiment, the stored encrypted first check code or identifier is declared correct if it is associated with information identifying a valid network node of the signing server and/or first entity, or information indicating a valid combination of check code and signing server and/or first entity. The identification of the signing server and/or first identity has been described in more detail in connection with the first and second aspects.

According to a further aspect, a network for safe data transmission is provided, comprising the following communicatively connected components: a signing server according to the second aspect, an archive server according to the fourth aspect, and a validation server according to the sixth aspect.

According to yet a further aspect, a combined server to perform the method according to the first and third aspects is provided.

By the term "identifying" should, in the context of the present application, be understood as any activity or process that connects the environment in which a signature was produced, such as e.g. the signing server, with an identity, such as e.g. its IP or MAC address, or e.g. a physical location of the server. The identification may e.g. include a two-way communication wherein a first packet of data is sent from the archive server to the signing server, using the IP address of the signing server and wherein the signing server answers by sending a second packet of data comprising a receipt, or confirmation. Cryptographic keys may be used in the signing server for encrypting check codes. They may also be used in an identification device used by a first entity causing the production of encrypted check codes. A cryptographic key, such as e.g. a private or public key of an asymmetric key pair, may be represented by a data file stored in a computer storage medium of the signing server. Such key may be e.g. be identified by a physical address which the key occupies in the computer storage medium of the signing server.

The term "associating" should be understood as the process of establishing a relationship between e.g. elements, information and/or identities. This can be realized by e.g. creating a data record or entry indicating the association.

The term "server" should be understood as a logical unit executing a set of actions according to a certain method. It can, e.g., be implemented in several physical or virtual servers rented from one or several hosting partners. It could e.g. be implemented by means of a set of interacting programs running of various servers provided from different parties.

Further, the term "having at its disposal" should be understood as "having at least partial authority or power to control". As an example, this could relate to a server, such as the signing server, having at least partial authority to control a unit, such as the second encrypting unit. This may e.g. be realized by the server being communicatively coupled to the unit. It may also be realized by controlling which program is executed on the unit. However, the term does not necessarily imply that the server and the unit are implemented in a single physical or logical entity or a single network.

The terms "causing" and "facilitating" may be interchangeably used in the context of the present application, such as e.g. "causing/facilitating calculation of a first check code". Causing/facilitating may also be described as "requesting or controlling another entity or unit to" calculate a first check code, to mention one example.

The term "payload data" (or actual data or body data) may refer to the cargo of a data transmission, i.e. the part of the transmitted data which is the fundamental purpose of the transmission. The payload data may hence not necessarily include overhead data or information such as headers and metadata, which may be transmitted with the payload data.

The invention may be embodied as computer-readable instructions for controlling a programmable computer in such manner that it performs the method according to the first, second, or third methods outlined above. Such instructions may be distributed in the form of a computer-program product comprising a computer-readable medium storing the instructions. In particular, the instructions may be loaded in a signing server, an archive server, or a validation server.

Further objectives of, features of and advantages with the present invention will be apparent when studying the following detailed disclosure, the drawings and the appended claims. Those skilled in the art realize that different features of the present invention, even if recited in different claims, can be combined in embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

All the figures are schematic and generally only show parts which are necessary in order to elucidate the invention, whereas other parts may be omitted or merely suggested.

DETAILED DESCRIPTION

Figure 1:
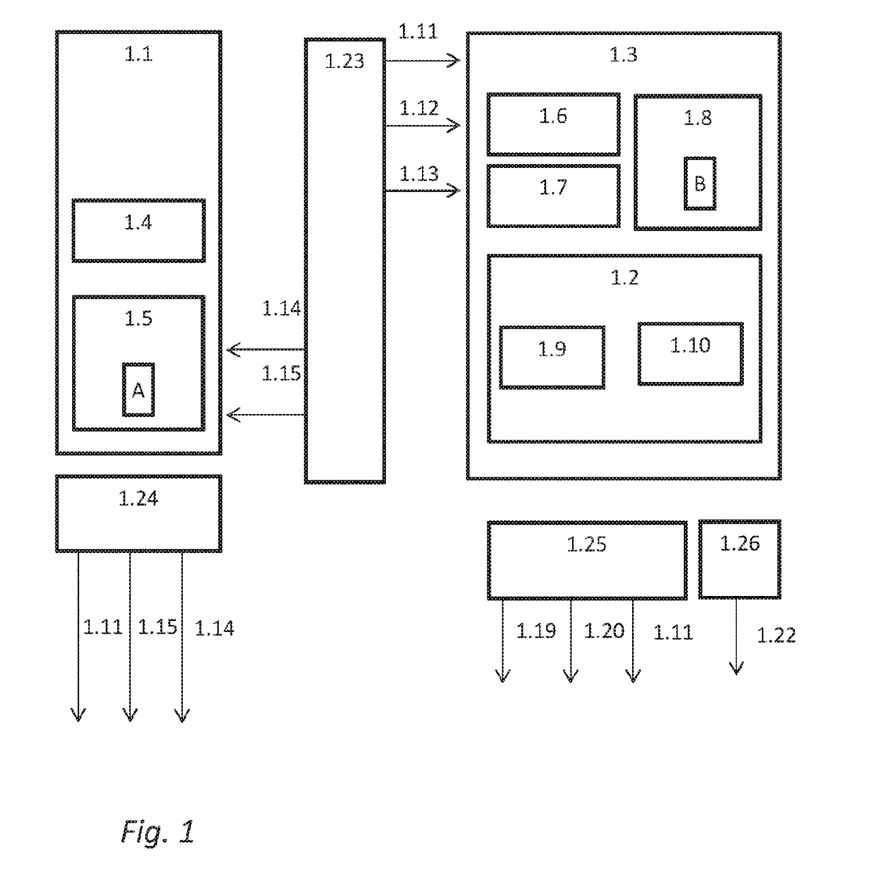
FIG. 1 illustrates a signing server according to an embodiment of the present invention.

FIG. 1 shows a signing server 1.1 comprising a first calculating unit 1.4 (e.g., a micro processor) and a first encrypting unit 1.5 having a first cryptographic key pair A, such as a first asymmetric key pair, which has been securely deposited in the encrypting unit 1.5. The signing server 1.1 also has at its disposal (e.g., is communicatively coupled to) a first and a second communication interface 1.23, 1.24, a second calculating unit 1.7, a time stamp generating unit 1.6 and a second encrypting unit 1.8 having a second cryptographic key pair B, such as a second asymmetric key pair. According to the present exemplifying embodiment, the second calculating unit 1.7, the time stamp generating unit 1.6 and the second encrypting unit 1.8 are comprised within a combined server 1.3, which further comprises an archive server 1.2 having a storage area, or storing unit 1.9 and a processing unit 1.10. The combined server 1.3 also has at its disposal a third communication interface 1.25 and a fourth communication interface 1.26. It will however be appreciated that the signing server 1.1 and the archive server 1.2 may be implemented as physically separate units (not shown).

According to the present embodiment, the signing server 1.1 may use the first calculating unit 1.4 to calculate a first check code based on a set of payload data and use the first encrypting unit 1.5 to encrypt the first check code using the first key pair A. The payload data may e.g. comprise a data file, a string of characters or other information to be transmitted with maintained authenticity and integrity. The signing server 1.1 may then send the encrypted first check code 1.11, an identifier of the first key pair 1.12, such as its serial number, and an identifier 1.13 of the signing server 1.1, such as its MAC address, over a communication network to the archive server 1.3, which may be associated with the first key pair A. The signing server 1.1 may e.g. use the first communication interface 1.23 and a web address to the archive server 1.2 during the communication.

The storing unit 1.9 in the archive server 1.2 is adapted to store the encrypted first check code, and may also monitor, over time, which signing server is using what key pair. This may e.g. be obtained by storing an association between the MAC address 1.13 of the signing server 1.1 and the serial number 1.12 of the first key pair A. The storing unit 1.9 in the archive server 1.2 may also store information about said association, declaring the signing server 1.1 to be valid or non-valid for said first key pair A, and may be adapted to provide the encrypted first check code 1.11 over the third communication interface 1.25 upon request by a validation server. Further, the archive server 1.2 may store an association between the first check code 1.11 and the signing server 1.1 and information whether the stored first check code 1.11 is valid or invalid. The latter information may be based on the classification of the associated signing server 1.1 as being valid or non-valid for the key pair A used to encrypt the encrypted first check code 1.11.

The signing server 1.1 as illustrated in FIG. 1 may be controlled by a software program that reads the MAC address of the signing server 1.1. Further, the combined server 1.3 may be adapted to only allow communication with the signing server 1.1 if a valid software program is installed. The software program may e.g. regarded as valid if it is associated with a trusted identity.

Additionally or alternatively, the first check code may be transmitted unencrypted from the first calculating unit 1.4 to the archive server 1.2, which may be adapted to store the unencrypted first check code, accordingly.

The storing of the first check code 1.11 may be combined with generating a time stamp at the time stamp generating unit 1.6, and calculating, by means of the second calculating unit 1.7, a second check code based on the first check code and the time stamp. Further, the second key pair B may be used to encrypt the second check code at the second encrypting unit 1.8, and the signing server 1.1 may receive the time stamp 1.14 and the encrypted second check code 1.15, as a response to sending the first check code 1.11. In particular, the combined sever may be configured to release the time stamp 1.14 and the encrypted second check code 1.15 only after it has received the first check code 1.11. The signing server 1.1 may then output the encrypted first check code 1.11 together with the encrypted second check code 1.15 and the time stamp 1.14 via the second communication interface 1.24.

Figure 2:
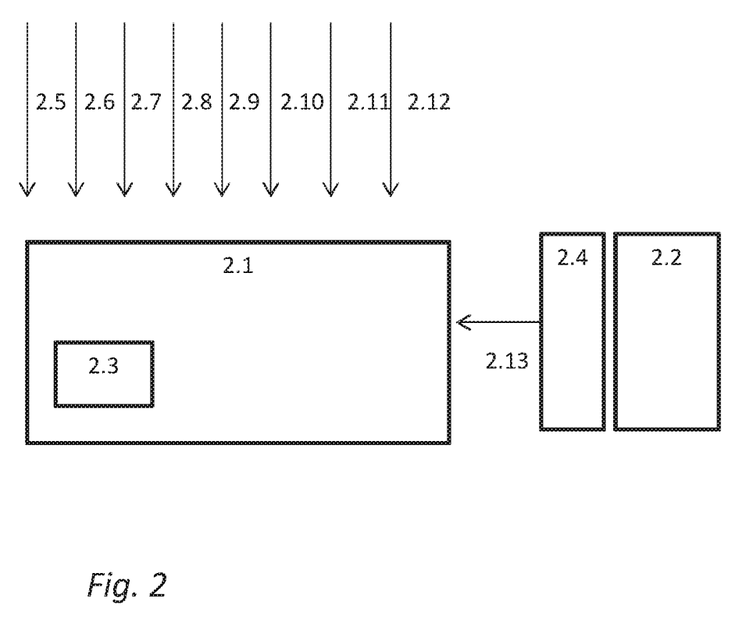
FIG. 2 illustrates a validation server, having at its disposal an archive server, in accordance with an embodiment of the present invention.

FIG. 2 shows a validation server 2.1 comprising a processing unit 2.3 which is adapted to verify, by means of a public key 2.6 of the first key pair A, the authenticity of a received encrypted first check code 2.7 based on a set of payload data 2.5. The processing unit 2.3 is also adapted to verify, using a public key 2.9 of a second asymmetric key pair B, the authenticity of a received encrypted second check code 2.8 based on the set of payload data 2.5, or information related to the set of payload data, and a time stamp 2.10. Further, the processing unit 2.3 is adapted to verify an association between the first and the second key pair, that received information 2.12 related to the revocation status of the first key pair (e.g. provided by the archive server) does not indicate that the public key 2.6 of the first asymmetric key pair A is revoked, and, in case there is an end time 2.11 associated with the first key pair A, that the time stamp 2.10 precedes the end time 2.11. In response to positive results of the above-mentioned verifications, authenticity and integrity of the set of payload data may be declared.

If the public key 2.6 of the first key pair A is associated with a revocation status as revoked, the validation server 2.1 may request at least one stored check code 2.13, which may be encrypted, from the archive server 2.2. The at least one stored check code 2.13 may be transferred to the validation server 2.1 over a communication interface 2.4, which validation server 2.1 may verify that the received first check code 2.7 corresponds to the stored check code 2.13. In case the received first check code 2.7 corresponds to a stored check code 2.13 being classified as valid, the validation server 2.1 may declare authenticity and integrity of the set of payload data 2.5.

The validation server 2.1 may also be adapted to verify that the start time of the first key pair A precedes the time stamp 2.10, that the start time of the second key pair B precedes the time stamp 2.10, and, in case there is an end time 2.11 associated with the second key pair B, that the end time 2.11 is later than the time stamp 2.10.

Referring to FIG. 1, the signing server 1.1 may, when producing the signature, request the time stamp 1.14 and the second encrypted check code 1.15 from the combined server 1.3 so as to enable for the validation server 2.1 to verify the association between the first and second key pairs A, B during the verification of the authenticity of the received encrypted second check code 2.8 (see FIG. 2). This way, the processing unit 1.10 in the archive server 1.2 can compare historic information indicating what key pair has been used in what signing server with received information about the current signing server 1.13 and the current key pair 1.12, and hence will be able to detect if a copy of the private key of the first key pair A has been deposited and used in a new signing server to produce valid signatures. If so, a warning message 1.22 can be prompted to a user or operator over e.g. the third or the fourth communication interface 1.25, 1.26. The operator may then stop using and/or order revocation of the first key pair, wherein the combined server 1.3 can store and/or transfer, to a validation server over the third communication interface 1.25, information indicating when the key pair ceased to be used 1.19 and/or that the key pair has been revoked 1.20. The warning message 1.22 may e.g. be prompted by means of an administrative web-application at the combined server 1.3.

If the first key pair A is revoked, all stored MAC addresses of signing servers 1.1 associated with the first key pair A may be classified as either valid or invalid by e.g. the archive server. For example, each signing server 1.1 may be declared not valid based on the warning message indicating that the key pair is being used on a previously unused signing server, which may indicate that the public key of the first key pair A has been stolen or is used without authorization.

Also the stored check codes that are encrypted with said first key pair A and associated with the corresponding signing server 1.1 may be classified in accordance with the classification of the signing server.

A revocation of a key pair may be realized by only declaring non-valid those check codes which have been produced in a non-valid signing server, while check codes produced in a valid signing server may still be declared valid.

Figure 3:
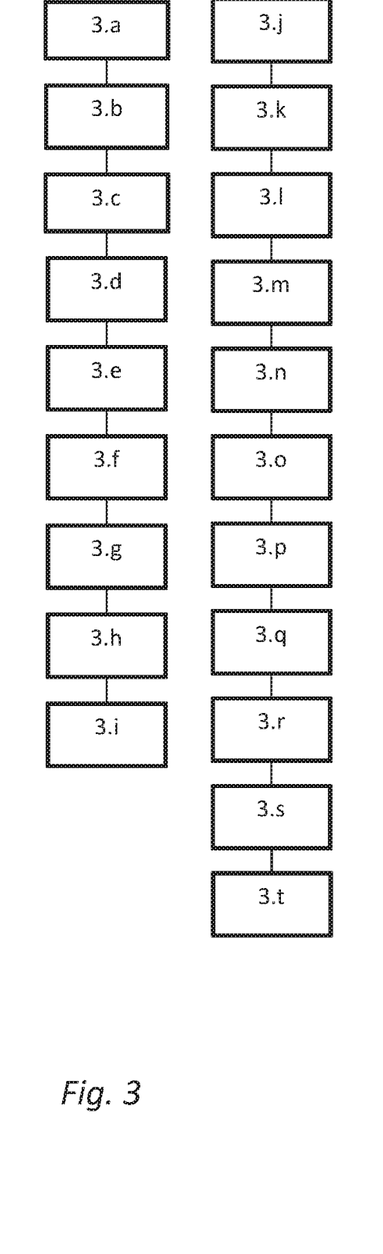
FIG. 3 is a flowchart of a method in a signing server and an archive server according to an embodiment of the present invention.

FIG. 3 is a flowchart illustrating a method in a signing server and an archive server, which are similar to the signing server and the archive server of FIG. 1. The method comprises:

calculating 3.*a* a first check code based on a set of payload data in a signing server;

encrypting 3.*b* the first check code using a private key of a first asymmetric key pair in said signing server;

calculating 3.*c*, at a combined server, a second check code based on the set of payload data and a time stamp;

encrypting 3.*d*, at the combined server, the second check code using a private key of a second asymmetric key pair;

transmitting 3.*e* said encrypted first check code from the signing server to a combined server containing an archive server, together with information identifying said signing server and information identifying said first key pair; and storing 3.*f* the encrypted first check code, or an identifier associated with said first check code, in a storage area of the archive server;

outputting 3.*g*, from the signing server, the encrypted first check code together with the encrypted second check code and time stamp.

Optionally, the method may also comprise one or several of the following steps:

generating 3.*h* the time stamp at the combined server;

storing 3.*i* an association between the signing server and first key pair in the storage area;

storing 3.*j* an association between the signing server and the first check code in the storage area;

comparing 3.*k* the information identifying the signing server and the information identifying first key pair with previously information stored in the storage area;

in response to the received information differing from the previously received information, outputting 3.*l* a warning message from the archive server to a user or an operator;

in response to the user or operator declaring the signing server as non-valid, e.g. based on the warning message, storing 3.*m* information indicating that the signing server is invalid;

declaring 3.*n* the stored encrypted first check code valid if it is associated with information indicating a valid signing server;

transmitting 3.*o* the encrypted second check code and time stamp from the combined server to the signing server;

in case a user or an operator declare that the first key pair has ceased to be used, storing 3.*p* in the archive server an end time associated with the public key of the first asymmetric key pair;

in case a user or an operator declare the that the first key pair is revoked, storing 3.*q* in the archive server information indicating that the public key of the first asymmetric key is revoked;

transmitting 3.*r* the first check code from the archive server to a validation server;

transmitting 3.*s*, from the archive server to a validation server, information about said end time associated with the public key of the first asymmetric key pair; and/or transmitting 3.*t*, from the archive server to a validation server, information indicating whether the first key pair is revoked or not.

Figure 4:
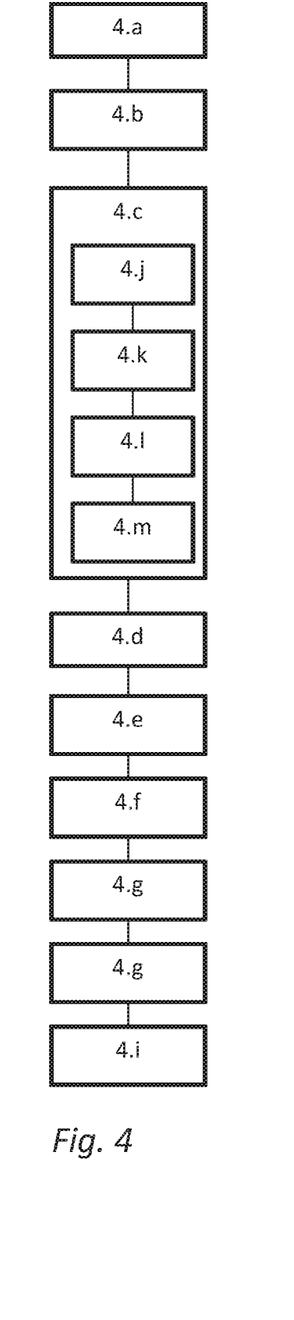
FIG. 4 is a flowchart illustrating a method in a validation server according to an embodiment of the present invention.

Finally, FIG. 4 illustrates a method in a validation server similar to the validation server as described with reference to FIG. 2. The method comprises the steps of:

verifying 4.*a*, using a public key of a first asymmetric key pair associated with a first trusted identity, the authenticity of a received encrypted first check code being based on a set of payload data;

verifying 4.*b*, using a public key of a second asymmetric key pair associated with a second trusted identity, the authenticity of a received encrypted second check code being based on the set of payload data or information related to the set of payload data and a time stamp;

in case there is an end time associated with the first key pair A, verifying 4.*c* that the time stamp precedes said end time;

verifying 4.*d*, based on received information related to the revocation status of the public key of the first asymmetric key pair A, that key pair A is not revoked;

in response to positive results of the steps 4.*a* to 4.*d*, declaring 4.*e* authenticity and integrity of the set of payload data;

in response to a negative result of step 4.*d*, requesting 4.*f* at least one valid stored encrypted first check code from an archive server and verifying 4.*g* that the received encrypted first check code corresponds to the stored encrypted first check code; and in response to a positive result of step 4.*g*, declaring 4.*h* authenticity and integrity of the set of payload data.

Optionally, the method may also comprise verifying 4.*i* that the first asymmetric key pair is associated with the archive server, e.g. by verifying that there is an association between the first key pair and the second key pair, where the second key pair, in turn, is associated with the archive server. Step 4.*c* may also comprise the further steps of:

verifying 4.*j* that the start time of the first key pair A precedes the time stamp;

verifying 4.*k* that the start time of the second key pair B precedes the time stamp;

in case there is an end time associated with the second asymmetric key pair, verifying 4.*l* that the time stamp precedes said end time; and in case there is an end time associated with the second key pair B, verifying 4.*m* that the end time succeeds the time stamp.

As outlined above, the above methods, in particular illustrated by FIGS. 3 and 4, may be implemented by instructions in software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory medium) and communication media (or transitory media). As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

The person skilled in the art realizes that the present invention by no means is limited to the preferred embodiments described above. On the contrary, many modifications and variations are possible within the scope of the appended claims. For example, each one of the signing server, the archive server, and the validation server may be understood as a physical server, a virtual server, or a functional server. Further, each of the signing server, the archive server and the validation server may comprise, or include, one or several of the first and second calculating units, the first and second encryption units, the time-stamp generating unit, the first and second communication interfaces, the storing unit, and the processing unit. The use of the term "unit" is for exemplifying purposes and is by no means intended to exclude, e.g., a distributed implementation in which the responsibilities and functionalities of a "unit" are handles by cooperating components. Variations and combinations of the disclosed embodiments can be understood and effected by the skilled person in practicing the claimed invention, from a study of the drawings, the disclosure, and the appended claims. The mere fact that certain features are recited in mutually different dependent claims does not indicate that a combination of these features cannot be used to advantage.

ITEMIZED LIST OF EMBODIMENTS

1. A method in a signing server, comprising:
a) causing calculation of a first check code based on a set of payload data;
b) causing encryption of the first check code using a private key of a first asymmetric key pair associated with a first trusted identity;
c) causing calculation of a second check code based on the set of payload data, or information derived from the set of payload data, and a time stamp;
d) causing encryption of the second check code using a private key of a second asymmetric key pair associated with a second trusted identity;
e) causing transmission of the encrypted first check code, or an identifier associated with said first check code to an archive server over a communication network;
f) causing storage of the encrypted first check code or said identifier in a storage area of the archive server; and
g) outputting the encrypted first check code.
2. The method according to embodiment 1, wherein the method further comprises:
causing storage of an end time associated with the public key of the first asymmetric key pair; and
causing storage of information indicating that the public key of the first asymmetric key is revoked.
3. The method according to embodiment 1 or 2, wherein the method is performed in response to a request by a first entity associated with the first trusted identity, and wherein the storage area of the archive server is protected from deletion effected upon request by the first entity.
4. The method according to any one of the preceding embodiments, further comprising at least one of:
identifying the signing server by means of its network node, preferably its IP address, or by means of a list of previously produced first check codes, encrypted first check codes or identifiers associated with said first check codes; and
identifying the first entity by means of an authentication means and/or an IP address of said authentication means and/or a list of first check codes, encrypted first check codes or identifiers associated with said first check codes, wherein said first check codes, encrypted first check codes or identifiers have been produced in response to a request by said first entity.
5. The method according to any one of the preceding embodiments, comprising:

receiving the encrypted second check code and the time stamp; and
outputting said encrypted second check code and time stamp together with the encrypted first check code.
6. The method according to embodiment 5, wherein the encrypted second check code is received from the archive server in response to transmitting the encrypted first check code or said identifier to the archive server.
7. The method according to any of embodiments 1 to 4, further comprising receiving information confirming storage of the encrypted first check code or said identifier in the storage area of the archive server.
8. The method according to any one of the preceding embodiments, wherein the first asymmetric key pair has been associated with an identity of the archive server.
9. A method in an archive server, comprising:
receiving, from a signing server, an encrypted first check code or an identifier associated with said first check code, the encrypted first check code being based on a set of payload data and having been generated using a private key of a first asymmetric key pair associated with a first trusted identity;
storing the encrypted first check code or said identifier in a storage area of the archive server; and
providing, upon request by a validation server, the stored encrypted first check code or said identifier.
10. The method according to embodiment 9, further comprising:
storing, in the storage area, an end time associated with the public key of the first asymmetric key pair; and
storing, in the storage area, information indicating that the public key of the first asymmetric key is revoked.
11. The method according to embodiment 9 or 10, wherein the storage area is protected from deletion effected upon request by the first entity.
12. The method according to any one of embodiments 9 to 11, further comprising obtaining, upon storing the encrypted first check code or said identifier, information identifying at least one of:
the signing server, the information representing its network node, preferably its IP address, or a list of previously produced first check codes, encrypted first check codes or identifiers associated with said first check codes; and
the first entity, the information being associated with an authentication means and/or being an IP address of said authentication means and/or a list of first check codes, encrypted first check codes or identifiers associated with said first check codes, wherein said first check codes, encrypted first check codes or identifiers have been produced in response to a request by said first entity.
13. The method according to any of embodiments 9 to 12, further comprising associating said received information, said first asymmetric key pair, and said encrypted first check code or said identifier.
14. The method according to any of embodiments 9 to 13, further comprising declaring the stored encrypted first check code or said stored identifier valid if it is associated with information identifying a valid signing server.
15. The method according to any of embodiments 9 to 14, further comprising: comparing said received information with previously received information which is stored in the storage area; and
in response to the received information differing from the previously received information, outputting a warning message.
16. The method according to any of embodiments 9 to 15, further comprising:

calculating a second check code based on a time stamp and said set of payload data;

encrypting the second check code using a private key of a second asymmetric key pair associated with a second trusted identity; and transmitting, to the signing server, the encrypted second check code and the time stamp.

17. The method according to embodiment 16, wherein the encrypted second check code and the time stamp are transmitted to the signing server only after the encrypted first check code has been received at the archive server.

18. The method according to any of embodiments 9 to 16, further comprising outputting information confirming storage of the encrypted first check code in the storage area of the archive server.

19. The method according to any of embodiments 9 to 18, wherein the first asymmetric key pair has been associated with an identity of the archive server.

25. A signing server, having at its disposal:

a first calculating unit adapted to calculate a first check code based on a set of payload data;

a first encrypting unit adapted to encrypt the first check code using a private key of a first asymmetric key pair associated with a first trusted identity;

a time-stamp generating unit, adapted to provide a time stamp;

a second calculating unit adapted to calculate a second check code based on the set of payload data and the time stamp;

a second encrypting unit adapted to encrypt the second check code using a private key of a second asymmetric key pair associated with a second trusted identity;

a first communication interface adapted to transmit the encrypted first check code or an identifier associated with said first check code to an archive server over a communication network, and to cause storage of the encrypted first check code or said identifier in a storage area of the archive server; and a second communication interface adapted to output the encrypted first check code.

26. The signing server according to embodiment 25, wherein the first communication interface is further configured to:

cause storage of an end time associated with the public key of the first asymmetric key pair; and cause storage of information indicating that the public key of the first asymmetric key is revoked.

27. The signing server according to embodiment 25 or 26, further adapted to operate in response to a request by a first entity associated with the first trusted identity, and wherein the storage area of the signing server is protected from deletion effected upon request by the first entity.

28. The signing server according to any one of embodiments 25 to 27, wherein the first communication interface is further adapted to:

identify the signing server by means of its network mode, preferably its IP address, or by means of a list of previously produced first check codes, encrypted first check codes or identifiers associated with said first check codes; and/or identify the first entity by means of an authentication means and/or an IP address of said authentication means and/or a list of first check codes, encrypted first check codes or identifiers associated with said first check codes, wherein said first check codes, encrypted first check codes or identifiers have been produced in response to a request by said first entity.

29. The signing server according to any of embodiments 25 to 28, wherein the first communication interface is further adapted to receive the encrypted second check code and the time stamp, and wherein the second communication interface is further adapted to output said encrypted second check code and time stamp together with the encrypted first check code.

30. The signing server according to embodiment 29, wherein the encrypted second check code is received from the archive server in response to the first communication interface transmitting the encrypted first check code or said identifier to the archive server.

31. The signing server according to embodiment 25 to 29, wherein the first communication interface is adapted to receive information derived from the set of payload data after the storage of the encrypted first check code or said identifier.

32. The signing server according to any of embodiments 25 to 32, wherein the first asymmetric key pair is associated with the archive server.

33. An archive server, having at its disposal:

a first communication interface adapted to receive, from a signing server, an encrypted first check code or an identifier associated with said encrypted first check code, said encrypted first check code being based on a set of payload data and having been encrypted using a private key of a first asymmetric key pair associated with a first trusted identity; and a storing unit adapted to store the encrypted first check code or said identifier in a storage area of the archive server, wherein the archive server further has at its disposal a second communication interface adapted to provide the encrypted first check code or said identifier upon request by a validation server.

34. The archive server according to embodiment 33, wherein the storing unit is further adapted to:

store, in the storage area, an end time associated with the public key of the first asymmetric key pair; and store, in the storage area, information indicating that the public key of the first asymmetric key is revoked.

35. The archive server according to embodiment 33 or 34, wherein the storage area is protected from deletion effected upon request by an entity associated with the first trusted identity.

36. The archive server according to any one of embodiments 33 to 35, wherein the first communication interface is further adapted to, upon receiving the encrypted first check code or said identifier, receive information identifying at least one of:

the signing server, the information representing its network node, preferably its IP address, or a list of previously produced first check codes, encrypted first check codes or identifiers associated with said first check codes; and the first entity, the information being associated with an authentication means and/or being an IP address of said authentication means and/or a list of first check codes, encrypted first check codes or identifiers associated with said first check codes, wherein said first check codes, encrypted first check codes or identifiers have been produced in response to a request by said first entity.

37. The archive server according to any of embodiments 33 to 36, wherein the storing unit is further adapted to associate said received information, said first key pair, and said encrypted first check code or said identifier.

38. The archive server according to any of embodiments 33 to 37, further having at its disposal a processing unit adapted to declare the stored encrypted first check code or said identifier valid if it is associated with information identifying a valid signing server.

39. The archive server according to any of embodiments 33 to 38, further having at its disposal a processing unit adapted to compare said received information with previously received information which is stored in the storage area, and a third communication interface adapted to output a warning message in response to said processing unit determining that the received information differs from the previously received information.

40. The archive server according to any of embodiments 33 to 39, further having at its disposal:
a calculating unit adapted to calculate a second check code based on a time stamp and a set of payload data;
an encrypting unit adapted to encrypt the second check code using a private key of a second asymmetric key pair associated with a second trusted identity, and
wherein the first communication interface is adapted to transmit, to the signing server, the encrypted second check code and the time stamp.

41. The archive server according to embodiment 40, wherein the encrypted second check code and the time stamp are transmitted to the signing server after the encrypted first check code or said identifier has been received by the first communication interface of the archive server.

42. The archive server according to any of embodiments 33 to 39, wherein the first communication interface is further adapted to output information derived from the set of payload data after the storing of the encrypted first check code or said identifier.

43. The archive server according to any of embodiments 33 to 42, wherein the first asymmetric key pair has been associated with an identity of the archive server.

44. A combined server to perform the method according to embodiments 1-8 and the method according to embodiments 9-19.

The invention claimed is:

1. A method in a validation server, comprising:
a) verifying, using a public key of a first asymmetric key pair associated with a first trusted identity, the authenticity of a received encrypted first check code being based on a set of payload data;
b) verifying, using a public key of a second asymmetric key pair associated with a second trusted identity, the authenticity of a received encrypted second check code which is based on the set of payload data, or information related to the set of payload data, and a time stamp;
c) verifying, if there is an end time associated with the public key of the first asymmetric key pair, that the time stamp precedes said end time;
d) verifying that the public key of the first asymmetric key pair is not revoked;
e) in response to positive results of the steps a) to d), declaring authenticity and integrity of the set of payload data;
f) in response to a negative result of step d) and at least in case of positive results of the steps a) to c), requesting at least one stored encrypted first check code, or an identifier associated with said first check code, from an archive server and verifying that the received encrypted first check code corresponds to the stored encrypted first check code or said stored identifier; and
g) in response to a positive result of step f), declaring authenticity and integrity of the set of payload data.

2. The method according to claim 1, wherein in step f) it is verified that the stored encrypted first check code or said stored identifier associated with a valid signing server or a valid first entity causing the calculation and encryption of the stored first check code.

3. The method according to claim 2, wherein:
said signing server is identified by means of its network node, preferably its IP address, or by means of a list of previously produced first check codes, encrypted first check codes or identifiers associated with said first check codes; and/or
said first entity is identified by means of an authentication means and/or an IP address of said authentication means and/or a list of first check codes, encrypted first check codes or identifiers associated with said first check codes, wherein said first check codes, encrypted first check codes or identifiers have been produced in response to a request by said first entity.

4. The method according to claim 3, further comprising outputting an alarm upon detection of a change in identity of the signing server and/or the first entity.

5. The method according to claim 3, further comprising declaring the first entity invalid upon detection of a change in identity of the first entity.

6. The method according to claim 1, wherein step d) further comprises verifying that the first asymmetric key pair is associated with the archive server.

7. The method according to claim 1, wherein step c) further comprises verifying, if there is an end time associated with the public key of the second asymmetric key pair, that the time stamp precedes said end time.

8. A non-transitory computer-readable medium that stores instructions for causing a programmable computer to perform the method according to claim 1.

9. A validation server, having at its disposal:
a processing unit adapted to
verify, using a public key of a first asymmetric key pair associated with a first trusted identity, the authenticity of a received encrypted first check code being based on a set of payload data;
verify, using a public key of a second asymmetric key pair associated with a second trusted identity, the authenticity of a received encrypted second check code being based on the first check code, or information derived from the set of payload data, and a time stamp;
verify, if there is an end time associated with the public key of the first asymmetric key pair, that the time stamp precedes said end time;
verify that the public key of the first asymmetric key pair is not revoked;
in response to positive results of the verifications, declaring authenticity and integrity of the set of payload data;
in response to the public key of the first asymmetric key pair being revoked, request at least one encrypted first check code, or an identifier associated with said first check code, from a communication interface of an archive server storing said encrypted first check code or said identifier and verify that the received encrypted first check code corresponds to said stored encrypted first check code or said identifier; and
in response to the received encrypted first check code and the stored encrypted first check code or said stored identifier corresponding, declare authenticity and integrity of the set of payload data.

10. The validation server according to claim 9, wherein the processing unit is further adapted to verify that that the stored encrypted first check code or said stored identifier is associated with a valid signing server or a valid first entity causing the calculation and encryption of the stored first check code.

11. The validation server according to claim 10, wherein the processing unit is adapted to:

identify said signing server by means of its network node, preferably its IP address, or by means of a list of previously produced first check codes, encrypted first check codes or identifiers associated with said first check codes; and/or identify said first entity by means of an authentication means and/or an IP address of said authentication means and/or a list of first check codes, encrypted first check codes or identifiers associated with said first check codes, wherein said first check codes, encrypted first check codes or identifiers have been produced in response to a request by said first entity.

12. The validation server according to claim 9, wherein the processing unit is further adapted to verify, if there is an end time associated with the public key of the second asymmetric key pair, that the time stamp precedes said end time.

13. The validation server according to claim 9, wherein the processing unit is further adapted to verify that the first asymmetric key pair has been associated with the archive server.

14. A network for safe data transmission comprising the following communicatively connected components:

a signing server having at its disposal:

a first calculating unit adapted to calculate a first check code based on a set of payload data;

a first encrypting unit adapted to encrypt the first check code using a private key of a first asymmetric key pair associated with a first trusted identity;

a time-stamp generating unit, adapted to provide a time stamp;

a second calculating unit adapted to calculate a second check code based on the set of payload data and the time stamp;

a second encrypting unit adapted to encrypt the second check code using a private key of a second asymmetric key pair associated with a second trusted identity;

a first communication interface adapted to transmit the encrypted first check code or an identifier associated with said first check code to an archive server over a communication network, and to cause storage of the encrypted first check code or said identifier in a storage area of the archive server; and a second communication interface adapted to output the encrypted first check code;

an archive server, having at its disposal:

a first communication interface adapted to receive, from a signing server, an encrypted first check code or an identifier associated with said encrypted first check code, said encrypted first check code being based on a set of payload data and having been encrypted using a private key of a first asymmetric key pair associated with a first trusted identity; and a storing unit adapted to store the encrypted first check code or said identifier in a storage area of the archive server, wherein the archive server further has at its disposal a second communication interface adapted to provide the encrypted first check code or said identifier upon request by a validation server; and the validation server according to claim 9.

* * * * *